(12) United States Patent
Bryll

(10) Patent No.: US 9,740,190 B2
(45) Date of Patent: Aug. 22, 2017

(54) METHOD FOR PROGRAMMING A THREE-DIMENSIONAL WORKPIECE SCAN PATH FOR A METROLOGY SYSTEM

(71) Applicant: Mitutoyo Corporation, Kanagawa-ken (JP)

(72) Inventor: Robert Kamil Bryll, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 524 days.

(21) Appl. No.: 14/511,100

(22) Filed: Oct. 9, 2014

(65) Prior Publication Data

US 2016/0103443 A1    Apr. 14, 2016

(51) Int. Cl.
   *G05B 19/21* (2006.01)
(52) U.S. Cl.
   CPC .... *G05B 19/21* (2013.01); *G05B 2219/23182* (2013.01)
(58) Field of Classification Search
   None
   See application file for complete search history.

(56) References Cited

U.S. PATENT DOCUMENTS

| | | | |
|---|---|---|---|
| 4,336,997 A | 6/1982 | Ross et al. | |
| 4,950,878 A | 8/1990 | Ulich et al. | |
| 6,184,974 B1 | 2/2001 | Neal et al. | |
| 6,542,180 B1 * | 4/2003 | Wasserman | H04N 5/2354 348/131 |
| 6,549,271 B2 * | 4/2003 | Yasuda | G03B 27/52 355/52 |
| 7,301,133 B2 | 11/2007 | Weiss | |
| 7,324,682 B2 | 1/2008 | Wasserman | |
| 7,454,053 B2 | 11/2008 | Bryll et al. | |
| 7,477,401 B2 | 1/2009 | Marx et al. | |
| 7,723,657 B2 | 5/2010 | Altendorf et al. | |
| 7,728,961 B2 | 6/2010 | Watson | |

(Continued)

OTHER PUBLICATIONS

Molesini et al., "Pseudocolor Effects of Longitudinal Chromatic Aberration," J. Optics 17(6), pp. 279-282, Paris, 1986.

(Continued)

*Primary Examiner* — Isaac T Tecklu
(74) *Attorney, Agent, or Firm* — Seed IP Law Group LLP

(57) ABSTRACT

A method for programming a three-dimensional (3D) workpiece scan path for a metrology system comprising a 3D motion control system, a first type of Z-height sensing system, and a second type of Z-height sensing system that provides less precise surface Z-height measurements over a broader Z-height measuring range. The method comprises: placing a representative workpiece on a stage of the metrology system, defining at least a first workpiece scan path segment for the representative workpiece, determining preliminary actual surface Z-height measurements along the first workpiece scan path segment, and determining a precise 3D scan path for moving the first type of Z-height sensing system to perform precise surface Z-height measurements. The precise 3D scan path is based on the determined preliminary actual surface Z-height measurements. The precise 3D scan path may be used for performing precise surface Z-height measurements or stored to be used in an inspection program.

20 Claims, 11 Drawing Sheets

(56) References Cited

U.S. PATENT DOCUMENTS

| | | | |
|---|---|---|---|
| 7,876,456 B2 | 1/2011 | Sesko | |
| 7,990,552 B2 | 8/2011 | Kouno | |
| 8,111,905 B2 | 2/2012 | Campbell | |
| 8,111,938 B2 | 2/2012 | Bryll et al. | |
| 8,194,251 B2 | 6/2012 | Emtman et al. | |
| 8,587,789 B2 | 11/2013 | Sesko | |
| 2003/0095700 A1* | 5/2003 | Yu | G06K 9/6253 382/154 |
| 2004/0223053 A1* | 11/2004 | Gladnick | G01N 21/8806 348/79 |
| 2007/0097381 A1* | 5/2007 | Tobiason | G06T 7/521 356/604 |
| 2008/0100850 A1* | 5/2008 | Watson | G01B 11/0608 356/601 |
| 2009/0088999 A1* | 4/2009 | Bryll | G01B 21/045 702/86 |
| 2009/0152440 A1* | 6/2009 | Altendorf | G01B 11/0608 250/201.4 |
| 2011/0133054 A1* | 6/2011 | Campbell | G01B 11/0608 250/201.2 |
| 2013/0120553 A1 | 5/2013 | Delaney et al. | |
| 2013/0120567 A1 | 5/2013 | Northrup et al. | |
| 2013/0123945 A1 | 5/2013 | Saylor et al. | |
| 2013/0125044 A1 | 5/2013 | Saylor et al. | |
| 2013/0162806 A1* | 6/2013 | Ding | G01B 11/0608 348/86 |
| 2014/0337780 A1* | 11/2014 | Northrup | G06F 3/04847 715/771 |
| 2014/0368726 A1* | 12/2014 | Gladnick | G01B 11/0608 348/349 |
| 2017/0078549 A1* | 3/2017 | Emtman | H04N 5/2351 |

OTHER PUBLICATIONS

Mitutoyo Corporation & Micro Encoder Inc., "QVPAK 3D CNC Vision Measuring Machine Operation Guide," Version 2.0, published Sep. 1996, 86 pages.

Mitutoyo Corporation & Micro Encoder Inc.,"QVPAK 3D CNC Vision Measuring Machine User's Guide," Version 7, published Jan. 2003, 329 pages.

U.S. Appl. No. 14/052,579, filed Oct. 11, 2013, entitled "System and Method for Controlling a Tracking Autofocus (TAF) Sensor in a Machine Vision Inspection System," 66 pages.

* cited by examiner

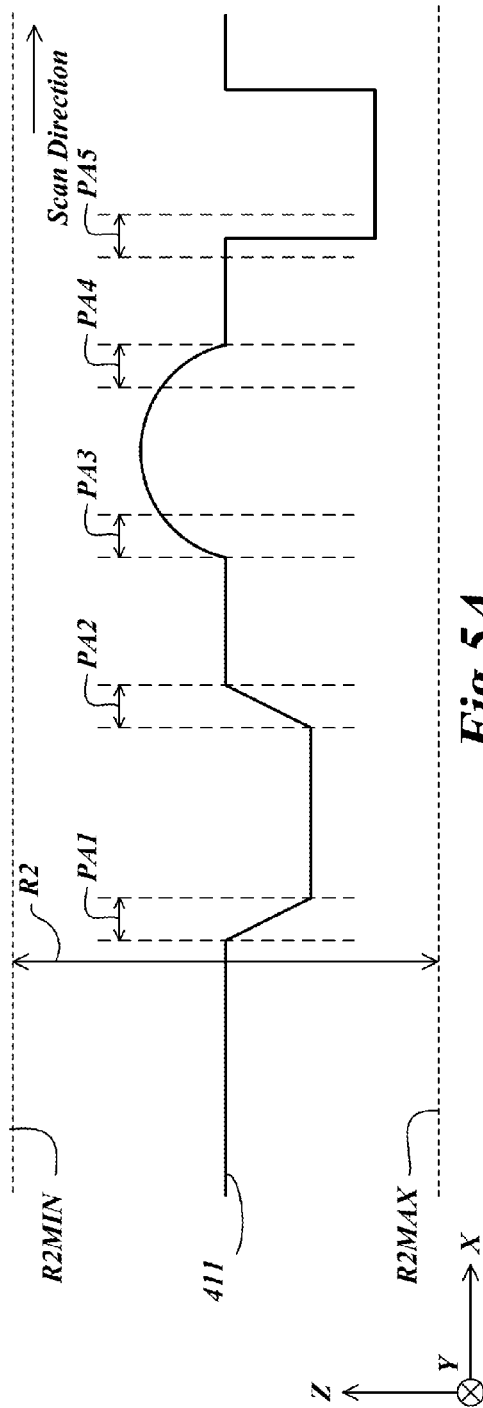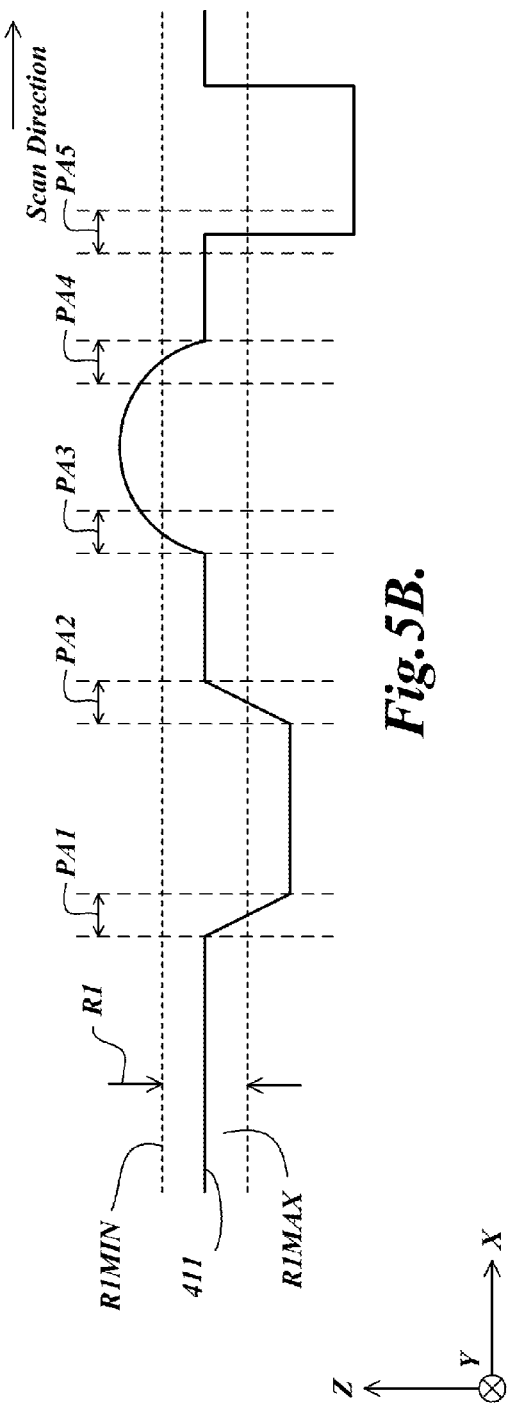

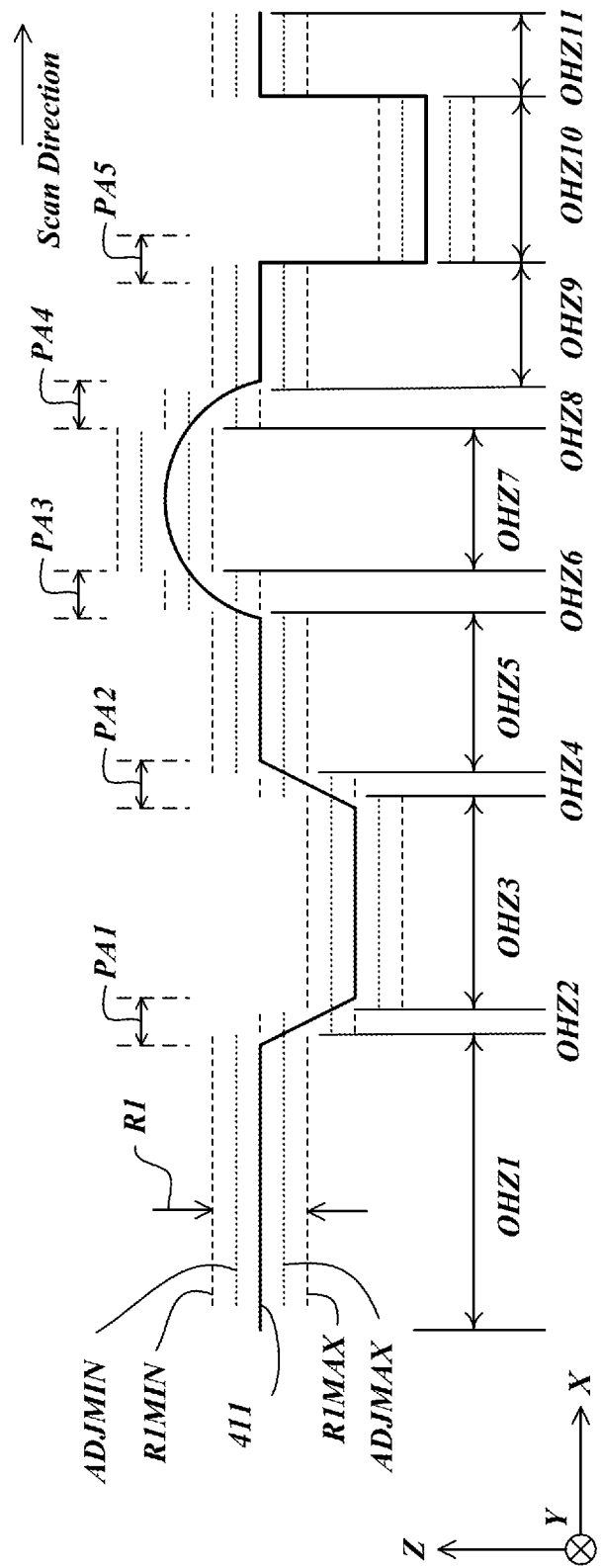

Fig.6A.

Line Tool — 610

| Sensor | Location | Scan Parameters | Filter/Data |

Regular
- ○ TAF (Tracking Auto Focus) — 620A
- ○ PFF (Points from Focus) — 620B

High Precision
- ● CRS (Chromatic Range Sensor) — 620C

621 — Offset  X  Y  Z
622 — Sample Rate
623 — Z Range

624 — Measurement Error Handling
- ● Ignore Missing Point — 624A
- ○ Error Flag — 624B
- ○ Stop — 624C

[Restore Defaults]  [Probe Settings]  [OK]  [Cancel]

Fig.6B.

Line Tool — 630

| Sensor | Location | Scan Parameters | Filter/Data |

Begin Scan Segment — 630A
X    Y    Z*
                  631A — Use Current

End Scan Segment — 630B
X    Y    Z*
                  631B — Use Current

ΔX   ΔY   ΔZ*

[Restore Defaults]  [Probe Settings]  [OK]  [Cancel]

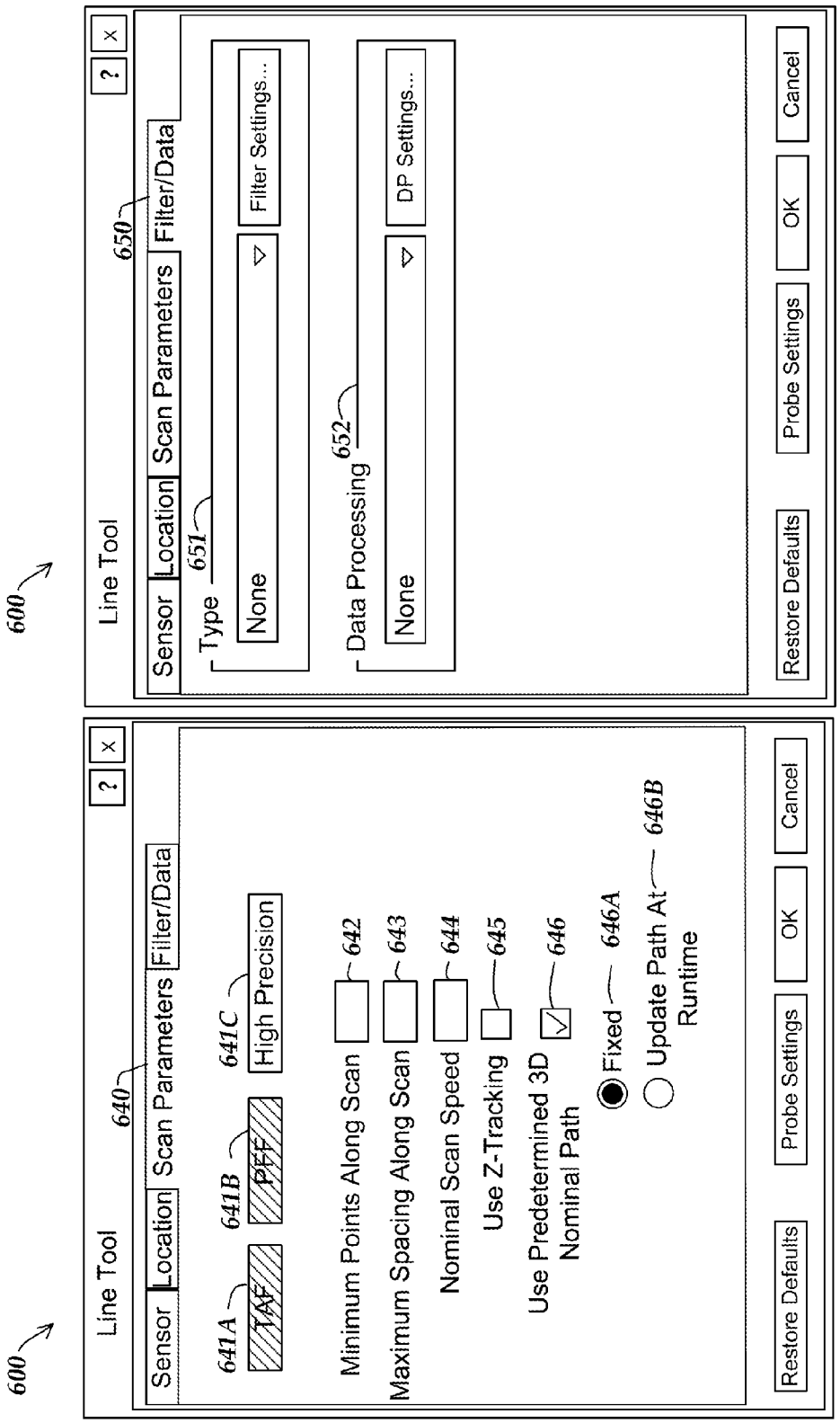

METHOD FOR PROGRAMMING A THREE-DIMENSIONAL WORKPIECE SCAN PATH FOR A METROLOGY SYSTEM

TECHNICAL FIELD

The invention relates generally to metrology systems including a machine vision inspection system and an auxiliary precision surface sensor, and more particularly to methods for operating and programming such systems.

DESCRIPTION OF THE RELATED ART

Precision machine vision inspection systems (or "vision systems," for short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This series of products, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface (GUI), or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) and other GUI features may be set up manually to accomplish inspection and/or machine control operations. Video tool set-up parameters and operations can also be recorded during learn mode, in order to create automatic inspection programs, or "part programs" which then incorporate measurement/analytical operations performed by various video tools. Video tools may include, for example, edge/boundary detection tools, autofocus tools, shape or pattern matching tools, dimension measuring tools, and the like. Such tools are routinely used in a variety of commercially available machine vision inspection systems, such as the QUICK VISION® series of vision systems and the associated QVPAK® software, discussed above.

Typical machine vision inspection systems do not provide high precision (e.g., micron or sub-micron precision) measurement capability for surface heights, i.e., in the direction of an optical axis of the optics system. However, such high precision measurement capability may be provided by an auxiliary sensor such as a chromatic range sensor (CRS), wherein chromatic aberration techniques are utilized for high precision distance sensing metrology. The operating principle of such sensors is generically described in "Pseudocolor Effects of Longitudinal Chromatic Aberration," G. Molesini and S. Quercioli, J. Optics (Paris), 1986, Volume 17, No. 6, pages 279-282, for example.

Generally speaking, in such systems an optical element having axial chromatic aberration is used to focus a broadband light source emerging from a small aperture such that the axial distance or height of a surface determines which wavelength is best focused at that surface. Upon reflection from the surface, the light is refocused onto that small aperture, such as a pinhole and/or the end of an optical fiber, and only the wavelength that is well-focused on the surface is well-focused on the aperture. Other wavelengths are poorly focused and will not couple much power into the aperture. A spectrometer measures the signal level for each wavelength returned through the aperture. A wavelength intensity peak effectively indicates the distance or height of the surface. Such auxiliary CRS sensors may be mounted alongside the main optical path of a machine vision inspection system, or may be partially integrated to share some components of the main optical path. Examples of CRS systems suitable for such configurations are disclosed in U.S. Pat. Nos. 8,587,789 and 7,477,401, for example, which are each incorporated herein by reference in their entirety. One problem with integrating such high precision CRS sensors with a typical machine vision inspection system is simplifying the related operation and programming of such CRS sensors, and making it robust, such that relatively unskilled users (who may not understand CRS sensors) may easily create reliable part programs that perform inspections using both the machine vision components and the CRS sensors in such integrated systems. A further problem is to allow relatively unskilled users to achieve high throughput in such part programs. A solution to such problems would be desirable.

BRIEF DESCRIPTION OF THE DRAWINGS

FIGS. 5A-C are schematic diagrams of a surface profile along a scan path segment across a workpiece, showing dimensional relationships related to measurement ranges for two types of Z-height sensing systems usable during workpiece scan operations;

FIGS. 6A-D are diagrams of one embodiment of a user interface usable for defining inspection operations along a workpiece scan path segment for a high precision Z-height sensing system during learn mode operations of a machine vision inspection system;

DETAILED DESCRIPTION

Figure 1:
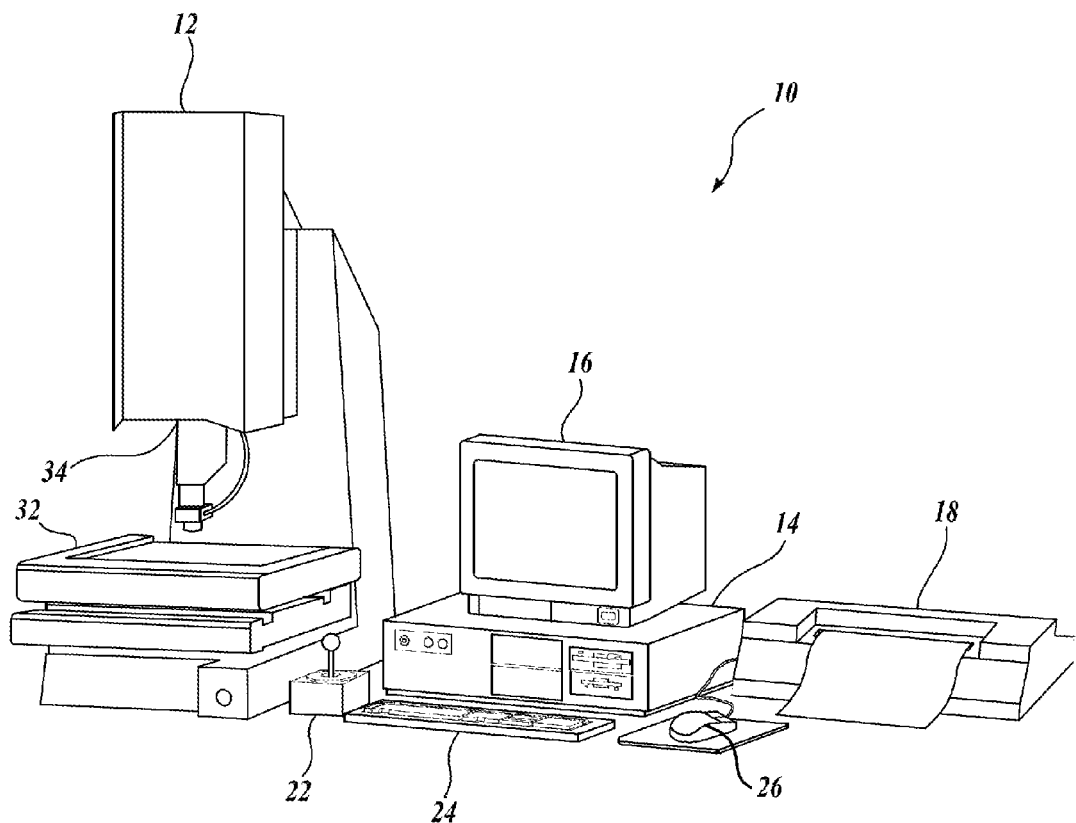
FIG. 1 is a diagram showing various typical components of a general purpose precision machine vision inspection system.

FIG. 1 is a block diagram of one exemplary machine vision inspection system (MVIS) 10 usable in accordance with the methods described herein. The MVIS 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the MVIS 10, including the various operations disclosed herein.

The vision measuring machine 12 includes a movable workpiece stage 32 and an optical imaging system 34. The MVIS 10 is generally comparable to the QUICK VISION® series of vision systems and the QVPAK® software discussed above, and similar state-of-the-art commercially available precision machine vision inspection systems. The MVIS 10 is also described in commonly assigned U.S. Pat. Nos. 7,454,053, 7,324,682, 8,111,905, and 8,111,938, which are each incorporated herein by reference.

Figure 2:
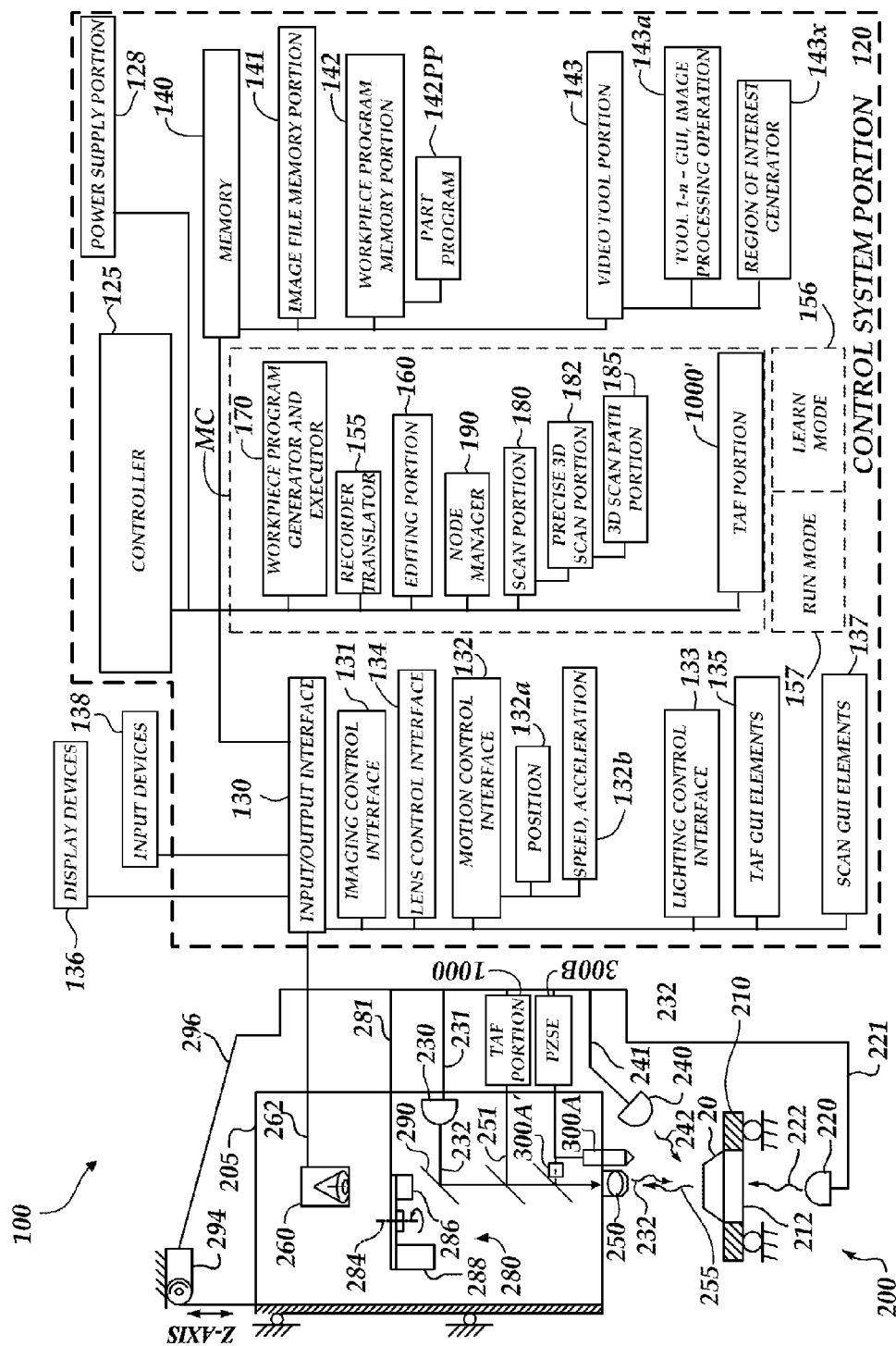
FIG. 2 is a block diagram of a control system portion and a vision components portion of a machine vision inspection system similar to that of FIG. 1, including modules and features usable in various embodiments according to this invention.

FIG. 2 is a block diagram of a control system portion 120 and a vision components portion 200 of an MVIS 100 similar to the MVIS 10 of FIG. 1. The control system portion 120 is utilized to control the vision components portion 200 and includes features usable in various embodiments according to the present invention. The vision components portion 200 includes an optical assembly portion 205, light sources 220, 230 and 240, part or all of a tracking autofocus (TAF) portion 1000 (which may instead reside partially in the control system portion 120), and a workpiece stage 210 having a central transparent portion 212. The vision components portion 200 may also include a precise Z-height sensor 300, which in one embodiment may comprise a precise Z-height sensor optical portion 300A (or 300A') and a precise Z-height sensor electronics portion 300B. In the illustrated embodiment, the precise Z-height sensor optical portion 300A and the objective lens 250 are offset from one another. This is not a requirement for practicing the invention disclosed herein. However, it is a typical case when the precise Z-height sensor is an optional or add-on accessory to a machine vision inspection system, and the invention and teachings disclosed herein are particularly advantageous in such a case. The workpiece stage 210 is controllably movable along X- and Y-axes that lie in a plane that is generally parallel to the surface of the stage where a workpiece 20 may be positioned. The optical assembly portion 205 includes a camera system 260 and an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included. The optical assembly portion 205 is controllably movable along a Z-axis that is generally orthogonal to the X- and Y-axes, by using a controllable motor 294.

A workpiece 20, or a tray or fixture holding a plurality of workpieces 20, which is to be imaged is placed on the workpiece stage 210. The workpiece stage 210 moves relative to the optical assembly portion 205 such that the interchangeable objective lens 250 moves between locations on a workpiece (or workpieces) 20. One or more of a stage light 220, a coaxial light 230, and a surface light 240 may emit source light 222, 232, or 242, respectively, to illuminate the workpiece 20. The light source 230 may emit light 232 along a path including a mirror 290. The source light is reflected or transmitted as workpiece light 255, which passes through the interchangeable objective lens 250 and the turret lens assembly 280 to the camera system 260. The image captured by the camera system 260 is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

The TAF portion 1000 may emit focusing light 251 to a half-silvered mirror and through the objective lens 250 to illuminate the workpiece 20. The focusing light is reflected back through the objective lens 250 and returned to a focus detector in the TAF portion 1000, which may then output a measurement and/or focus correction signal to the control system portion 120 on a signal and/or control line or bus. In various embodiments, the TAF portion 1000 may be based on any of various known focus sensor techniques, such as a knife edge focus technique, a chromatic confocal technique that provides a large measurement range, or Shack-Hartmann type of wavefront sensing technique, and so on. The latter technique is described in co-pending U.S. patent application Ser. No. 14/052,579, titled "System and Method for Controlling a Tracking Autofocus (TAF) Sensor in a Machine Vision Inspection System," which is hereby incorporated herein by reference in its entirety.

In various exemplary embodiments, the optical assembly portion 205 is movable in the vertical Z-axis direction using a controllable motor 294 that drives an actuator to move the optical assembly portion 205 along the Z-axis to change the focus of the image captured by the camera system 260. The term Z-axis, as used herein, refers to the axis that is used for focusing the image obtained by the optical assembly portion 205. The controllable motor 294, when used, is connected to the input/output interface 130 via a signal line 296.

In one embodiment, when the TAF portion 1000 is active, the control system portion 120 is responsive to its measurement and/or focus correction signal and moves or servos the Z-axis based on the TAF signal until the TAF portion 1000 outputs a measurement and/or focus correction signal corresponding to a best focus position. In some embodiments, the machine vision inspection system 100 may be adjusted and/or calibrated such that this best focus position corresponds to the best focus position of the camera system 260. Furthermore, such position and/or measurement information may be used to locate the surface of the workpiece 20 within the measurement range (e.g., approximately in the middle of measurement range) of precise Z-height sensor 300, according to principles described in greater detail below.

As shown in FIG. 2, in various exemplary embodiments, the control system portion 120 includes a controller 125, a power supply portion 128, an input/output interface 130, a memory 140, a workpiece program (part program) generator and executor 170, a recorder/translator 155, a learn mode executor 156, a run mode executor 157, an editing portion 160, a node manager 190, a TAF portion 1000', and a scan portion 180, which may comprise a precise 3D scan portion 182 including a 3D scan path portion 185. Each of these components, as well as the additional components described below, may be interconnected by one or more data/control busses and/or application programming interfaces, or by direct connections between the various elements.

As will be apparent to those skilled in the art, various operations regarding the TAF portion 1000 (and/or 1000') and/or the precise Z-height sensor 300 may be implemented by hardware configuration, software configuration, or a combination of hardware and software configuration and, therefore, various hardware and/or software components and features of the TAF portion 1000 and/or the precise Z-height sensor 300 may be suitably arranged between the vision components portion 200 and the control system portion 120 of the MVIS 100, depending on each implementation.

The workpiece program (or part program) generator and executor 170, recorder translator 155, learn mode executor 156, run mode executor 157, editing portion 160, node manager 190, TAF portion 1000', and scan portion 180, may be considered to be part of a general machine controller block MC that is linked to the controller 125. The workpiece program generator and executor 170 is responsible for creating and executing part programs (or "workpiece programs"). Based on the operations of the workpiece program generator and executor 170, a user utilizes the MVIS 100 to create a part program for the workpiece 20, either by coding the instructions using a workpiece programming language, and/or by generating the instructions by operating the MVIS 100 in a learn mode (e.g., as controlled by the learn mode executor 156) to provide a desired image acquisition training sequence. For example, a training sequence may comprise positioning a workpiece feature in the field of view (FOV), setting light levels, focusing or autofocusing, acquiring an image, and providing an inspection training sequence applied to the image (e.g., using video tools). The learn mode operates such that the "learned" operation sequence(s) are recorded and converted to corresponding part program steps (i.e., instructions). These part program steps, when the part program is executed in a run mode (e.g., as controlled by the run mode executor 157), will cause the MVIS 100 to reproduce the trained image acquisition and inspection operations to automatically inspect a workpiece or workpieces matching the workpiece used when creating the part program.

The recorder translator 155 is utilized for translating machine operations into part program code. In other words, if a user performs an action (e.g., such as manually changing the Z-height corresponding to the current surface height), a basic instruction is generated that is translated into a machine readable language to form a part program, and a reverse translation may also be performed. The recorder translator 155 may also perform translation between editable instruction representations in a GUI and their corresponding code instructions. The editing portion 160 provides or activates various operations and user interface features related to editing a part program, which may include controlling the operations for the editing functions, and providing the user interface features for the editing functions. In one embodiment, the node manager 190 is responsible for managing node numbers that are assigned to nodes in a part program and to their corresponding instruction representations in a GUI. The node numbers controlled by the node manager 190 may be used, for example, to arrange the part program instruction representations including TAF portion operations and scan portion operations in a prescribed order, for example according to various embodiments described below.

The TAF portion 1000' provides or activates various operations and user interface features, such as those captured in the TAF GUI elements 135, related to TAF functionality in an MVIS 100. The scan portion 180 provides or activates various operations and user interface features, such as those captured in the scan GUI elements 137, related to scan functionality. These may include precise Z-height scan functionality and precise 3D scan path functionality as disclosed herein.

The input/output interface 130 includes an imaging control interface 131, a motion control interface/system 132, a lighting control interface 133, a lens control interface 134, TAF GUI elements 135, and scan GUI elements 137. The TAF GUI elements 135 are responsible for providing a GUI for controlling and programming TAF operations. The scan GUI elements 137 are responsible for providing a GUI for controlling and programming scanning operations (e.g., as may be implemented using the scan portion 180, including the precise 3D scan portion 182 and 3D path portion 185), as described in greater detail below. The motion control interface/system 132 may include a position control element 132a, and a speed/acceleration control element 132b, although such elements may be merged and/or indistinguishable.

The memory 140 includes an image file memory portion 141, a workpiece program memory portion 142 that may include one or more part programs, or the like, and a video tool portion 143. The video tool portion 143 includes video tool portion 143a and other video tool portions (not shown), which determine the GUI, image processing operation, etc., for each of the corresponding video tools. Many known video tools are included in the commercially available machine vision inspection systems discussed previously. The video tool portion 143 also includes a region of interest (ROI) generator 143x that supports operations that define various ROIs that are operable in various video tools.

In general, the memory portion 140 stores data usable to operate the vision system components portion 200 to acquire an image of the workpiece 20 such that the acquired image has desired characteristics. The memory portion 140 may also store inspection result data, data usable to perform various inspection and measurement operations on the acquired images (e.g., implemented, in part, as video tools), either manually or automatically, and to output the results through the input/output interface 130. The memory portion 140 may also contain data defining a user interface operable through the input/output interface 130.

Various signal lines or busses may be connected to the input/output interface 130, including signal lines from the TAF portion 1000 and the precise Z-height sensor 300, as schematically represented in FIG. 2. One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various user interface features that are usable to perform inspection operations, and/or to create and/or modify part programs, to view the images captured by the camera system 260, and/or to directly control the vision system components portion 200.

In various exemplary embodiments, when a user creates a part program for the workpiece 20, the user generates part program instructions either by coding using a workpiece programming language, and/or by generating the instructions by operating the MVIS 100 in a learn mode to provide a desired image acquisition training sequence. For example a training sequence may comprise positioning a workpiece feature in the field of view (FOV), setting light levels, focusing or autofocusing, acquiring an image, and providing an analysis training sequence applied to the image (e.g., using video tools). The learn mode operates such that the sequence(s) are captured or recorded and converted to corresponding part program steps (i.e., instructions). These part program steps, when the part program is executed, will cause the machine vision inspection system to reproduce the trained image acquisition and analysis operations to automatically inspect a workpiece or workpieces matching the workpiece used when creating the part program. Related editing features and functions are also described in US Patent Publication Nos. 20130123945 titled "Machine Vision System Program Editing Environment Including Real Time Context Generation Features"; 20130125044 titled "Machine Vision System Program Editing Environment Including Synchronized User Interface Features"; and 20130120567 titled "System and Method Utilizing an Editing Initialization Block in a Part Program Editing Environment in a Machine Vision System," each of which is hereby incorporated by reference.

Figure 3:
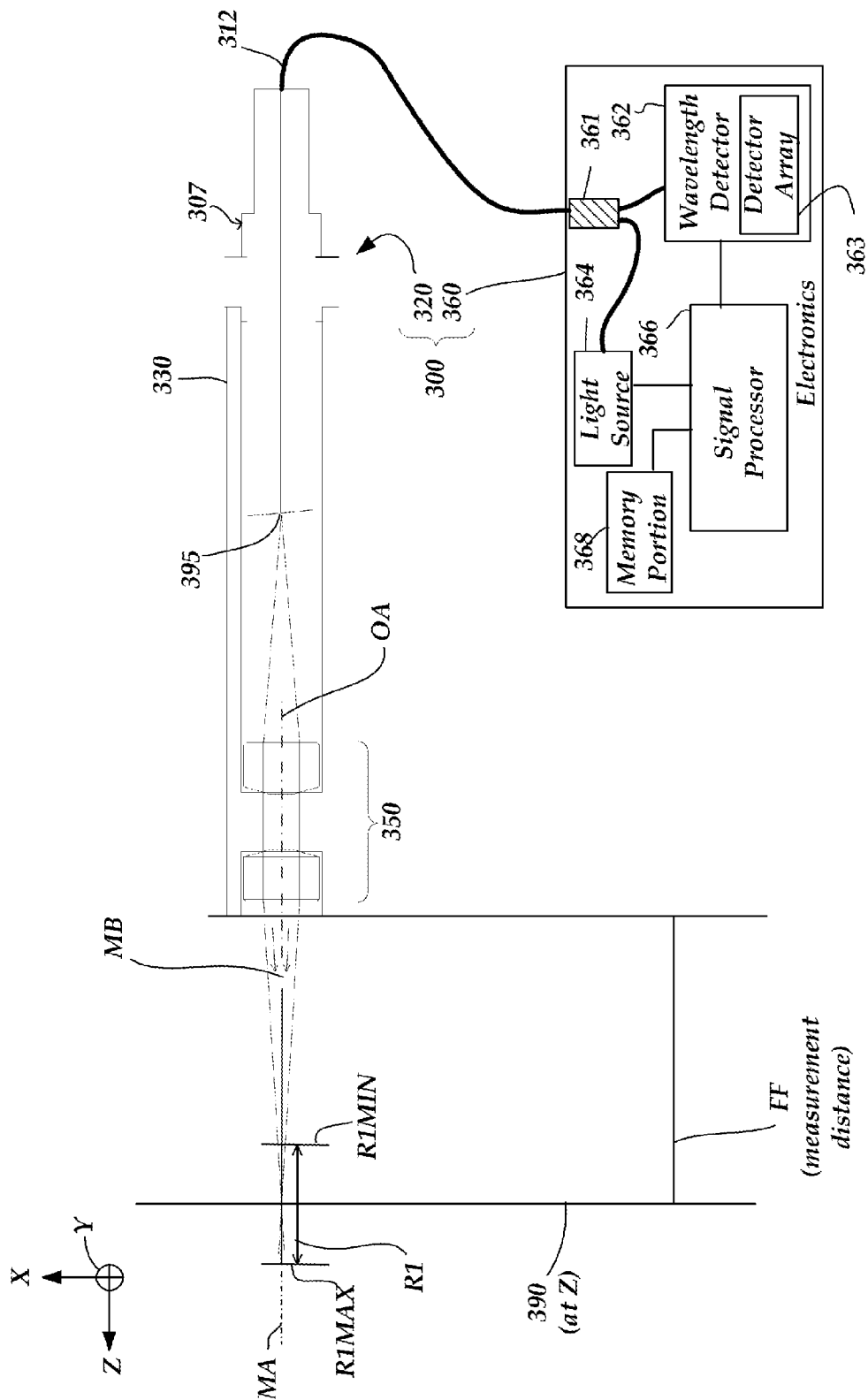
FIG. 3 is a block diagram of an exemplary chromatic confocal point sensor usable as a precise Z-height sensor.

FIG. 3 is a block diagram of an exemplary chromatic confocal point sensor 300, sometimes referred to as a chromatic range sensor (CRS), which is one embodiment of a precise Z-height sensor usable according to principles disclosed herein. The CRS 300 has certain similarities to sensors described in commonly assigned U.S. Pat. Nos. 7,990,552, 7,876,456 and 8,194,251, each of which are hereby incorporated herein by reference in their entirety. Using commercially available chromatic range sensors in conjunction with a machine vision system, approximately as schematically represented in FIG. 2, is known, and the CRS is described only briefly here to provide useful background for understanding the problems that arise in conjunction with programming the use of a precise Z-height sensor in a machine vision system. As shown in FIG. 3, the chromatic confocal point sensor 300 includes an optical pen 320 and an electronics portion 360 connected by a fiber optic cable 312 comprising an in/out optical fiber. The optical pen 320 may provide one embodiment of the optical portion 300A shown in FIG. 2, and the electronics portion 360 may provide one embodiment of the electronics portion 300B shown in FIG. 2.

Briefly, the electronics portion 360 includes a fiber coupler 361, the wavelength detector 362, a light source 364, a signal processor 366 and a memory portion 368. In various embodiments, the wavelength detector 362 includes a spectrometer or spectrograph arrangement wherein a dispersive element (e.g., a grating) receives the reflected radiation through the optical fiber cable 312 and transmits the resulting spectral intensity profile to a detector array 363 for sensing and analysis. The optical pen 320 includes a fiber optic connector 307, a housing 330, and an axially dispersive optical element 350. The axially dispersive optical element 350 is arranged along an optical axis OA of the optical pen 320 to receive the broadband source radiation from the fiber aperture 395, output it toward a workpiece surface 390 as a focused measurement beam MB having axial chromatic dispersion, and receive reflected radiation from the workpiece surface 390 and focus the reflected radiation proximate to the fiber aperture 395 with axial chromatic dispersion, as is known for CRS systems. Due to the axial chromatic dispersion, only one wavelength will have a front focus dimension FF that matches the measurement distance from the optical pen 320 to the workpiece surface 390. The optical pen 320 is configured such that the wavelength that is best focused at the workpiece surface 390 will also be the wavelength of the reflected radiation that is best focused at the fiber aperture 395. Predominantly the best focused wavelength passes through the fiber aperture 395 and into the core of the optical fiber cable 312. As described in more detail in the incorporated references, the optical fiber cable 312 routes the reflected signal radiation to a wavelength detector 362 that is utilized for determining the wavelength having the dominant intensity, which corresponds to the measurement distance to the workpiece surface 390. The optical pen 320 has a measuring range R1 that is bounded by a minimum range distance R1MIN and a maximum range distance R1MAX, related to minimum and maximum sensed wavelengths in the system. Generally speaking, in many such CRS systems the resolution and/or accuracy is a roughly fixed proportion of the measuring range. Generally speaking, to achieve better resolution and/or accuracy the numerical aperture of the system is increased, which reduces the measuring range R1. For high accuracy CRS systems, which provide micron or sub-micron level resolution or accuracy, the measuring range R1 may often be as small as 1 mm, or 500 μm, or even less. Some semiconductor ICs or the like may be conveniently inspected using such CRS systems because their surfaces are nearly flat and fall entirely within this measurement range. However, in contrast to specialized IC inspection equipment, many general purpose precision machine vision inspection systems are designed to measure other types of workpieces having surfaces which vary over a far larger range (e.g., tens or hundreds of millimeters). Prior art "combination" systems have provided no convenient or practical means of creating a part program which can quickly scan such varying surfaces using high accuracy CRS systems (e.g., for the purpose of surface finish measurement, or the like). Thus, CRS systems and similar precise Z-height sensing systems have not been widely deployed in combination with machine vision inspection systems. The principles and features disclosed below may be used to overcome this deficiency.

Figure 4:
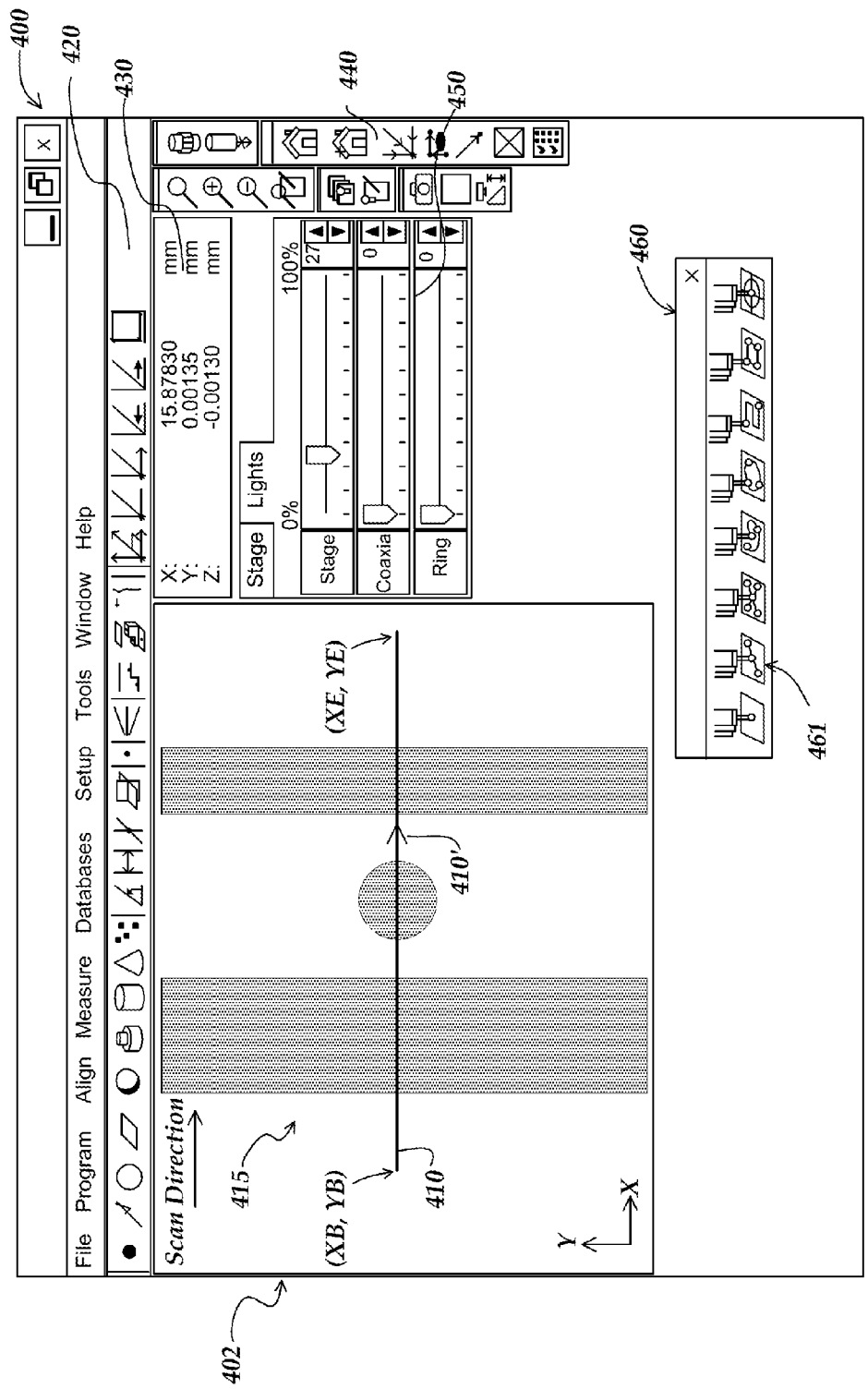
FIG. 4 is a diagram of an exemplary user interface of a metrology system, including a representation of a scan path segment across a workpiece surface.

FIG. 4 shows a diagram of an exemplary user interface or GUI 400 including a field of view window 402 of a metrology system which includes a portion of a representative workpiece 415 on a stage of the metrology system. The user interface 400 also includes various measurement and/or operation selection bars such as selection bars 420 and 440, a real-time X-Y-Z (position) coordinate window 430, a light control window 450 and a scan tool window 460. The representative workpiece 415 includes surface Z-heights over a range exceeding a Z-height measuring range of a high precision Z-height sensor such as the chromatic confocal point sensor 300, as will be shown in further detail in FIGS. 5A-C. The line tool selector 461 may be selected by a user from the scan tool window 460 to begin operations for defining a line scan operation which determines a set of Z-height measurements along a workpiece scan path segment 410, which may appear in the display in response to the selection of the line tool selector 461. As shown in the field of view window 402, the workpiece scan path segment 410 is defined for the representative workpiece, beginning at beginning XY coordinates (XB, YB) and ending at ending XY coordinates (XE, YE). The beginning and ending coordinates may be defined graphically by dragging and dropping the workpiece scan path segment 410 (or its individual endpoints) on the display, and/or by entering numerical values in user interface features as outlined further below. In the example shown in FIG. 4, a scan direction of the line tool is defined along the +X direction along the workpiece scan path segment 410, as indicated by the scan direction arrow 410'.

FIGS. 5A-C are schematic diagrams of a surface profile cross section 411 of the representative workpiece 415 shown in FIG. 4, including dimensional relationships related to measurement ranges of two types of Z-height sensing systems during workpiece scan operations. The cross section 411 is along the workpiece scan segment 410.

FIG. 5A shows a measuring range R2 of a less precise type of Z-height sensing system (e.g., the TAF system previously described with reference to FIG. 2) which is bounded in the Z direction by the Z values R2MIN and R2MAX. In exemplary embodiments, the less precise type of Z-height sensing system may be a tracking autofocus system or a points from focus system as incorporated in a machine vision inspection system such as the MVIS 100. In some embodiments, if the motion control system of a machine vision inspection system is designed to servo the Z-axis in response to an error signal or measurement from the less precise type of Z-height sensing system, then the measuring range R2 may encompass the entire Z range of the machine vision inspection system. In any case, in the illustrated example, the surface of the representative workpiece 415 is entirely within the range R2 along the workpiece scan segment 410. This is typical and/or desirable for the various types of "less precise" Z-height sensing systems found in machine vision inspection systems. In some cases, such "less precise" systems may provide accuracy on the order of microns, or tens of microns.

In addition, for reference, FIG. 5A also shows problem areas PA1-5, which correspond to sections of the representative workpiece 415, which may be problematic for performing Z-height measurements. Such problem areas may be encountered at the edges of surface features or solder balls, or the like. The problem areas PA1-5 may include steep transitions in Z-height which may cause highly erroneous or failed Z-height measurements. For example, depending on the type of Z-height sensing system used, such erroneous and/or failed measurements may be due to inadequate reflected signal light, and/or inadequate lateral resolution or selectivity, and/or inadequate Z-axis sensing response time in comparison to the scan velocity across the problem areas, or the like. In various applications, it may be more advantageous to measure Z-heights along the workpiece scan segment 410 using a more precise type of Z-height sensing system. This may provide better measurement accuracy and may also mitigate or eliminate some of the problems in the problem areas outlined above. However, it may also introduce additional problems as outlined below.

FIG. 5B shows a range R1 of a more precise type of Z-height sensing system (e.g., the precise Z-height sensor 300 previously described with reference to FIG. 2) which is bounded in the Z direction by the Z values R1MIN and R1MAX. In some embodiments, the more precise type of Z-height sensing system may be a chromatic range sensor such as the chromatic confocal point sensor 300 described with reference to FIG. 3. As shown in FIG. 5B, the range R1 is too small to encompass all Z-height measurements along the workpiece scan segment 410 without adjusting the overall height of the more precise type of Z-height sensing system a number of times during the scan. Failure to adjust the overall height will result in measurement failure and/or collision. Thus, an overall height adjustment is necessary to perform the scan. However, it has not been possible for relatively unskilled users to program such overall sensor height adjustment, for a variety of parts, reliably, quickly and accurately in a machine vision inspection system. For a variety of parts (e.g., ball grid arrays, circuit boards, gears, etc.) the programming and debugging time to create reliable high throughput programs that achieve overall height adjustment is prohibitive, even for suitably skilled programmers, for a number of reasons. For example, in addition to the tedious number of height adjustments that might be required for scanning a ball grid array or circuit board, precise type of Z-height sensors are typically auxiliary to machine vision inspection systems, and not integrated with their motion/servo systems. Thus, programming overall adjustments based on signals from the precise Z-height sensor may be difficult to perform and/or limit throughput. Also, users may not understand the types of errors that may occur for the precise Z-height sensor in the vicinity of the problem areas PA1-PA5, resulting in unexpected program and/or measurement failures. Alternatively, servoing the overall Z-height based on the less precise Z-height sensor system may also exhibit problems as outlined above, and may furthermore cause unexpected errors due to unanticipated interactions between the less precise and more precise Z-height sensor systems (e.g., Z motion during a measurement sample, or the like), particularly in the vicinity of the problem areas PA1-PA5. Disclosed below are various automatic operations and/or related user interface features which allow relatively unskilled users to overcome such problems, and quickly program Z-height scans using precise type Z-height sensors.

Similarly to FIG. 5B, FIG. 5C shows a range R1 of a more precise type of Z-height sensing system (e.g., the precise Z-height sensor 300 previously described with reference to FIG. 2) which is bounded in the Z direction by the Z values R1MIN and R1MAX. FIG. 5C further shows overall height adjustment zones OHZ1-OHZ11 (generically, OHZi) along the scan segment 410, wherein in each zone OHZi the overall Z-height of the precise Z-height sensor is adjusted to keep the nominal surface profile (indicated by the cross-section 411) within the measuring range R1. The nominal surface profile may be determined using the less precise Z-height sensor, and the overall height settings for each zone OHZi determined accordingly, as described below. In this particular embodiment, at the beginning of each zone along the scan direction the overall height is set such that the workpiece surface is nominally at the middle of the range R1. That overall height is held in the zone along the scan direction until the workpiece surface reaches one of the adjustment limits ADJMIN or ADJMAX in the measurement range. At that point along the scan direction, the overall height is adjusted for the beginning of a "new" subsequent zone along the scan direction. This procedure for establishing overall nominal Z-height settings for the precise Z-height sensor along the scan direction establishes a measurement range "safety buffer" (e.g., of approximately 25% of the range R1 in the illustrated example) relative to the measurement range limits R1MIN and R1MAX, respectively. Furthermore, when using such an overall Z-height path along the scan segment, within each zone the scan may proceed along the scan direction safely, quickly and reliably (and regardless of potential precise Z-height measurement errors) as fast as the precise Z-height sensor sample rate allows. Measurements may need to be interrupted (if necessary) only during the overall Z-height adjustments between the zones. Furthermore, in some embodiments, once the overall Z-height path is established along a scan segment, the motion control for the scan can be operated in an "open loop" fashion (e.g., without servo control and associated unpredictable variations and errors), thereby providing a predictable high-throughput scan speed, and robustness during program execution. It will be appreciated that combining the previously established XY coordinates of the scan path segment 410 with the overall nominal Z-height settings used at various locations along the scan direction (e.g., as outlined above) provides precise three-dimensional (3D) scan path for moving the first type of Z-height sensing system to perform precise surface Z-height measurements on a scan path segment, wherein the precise 3D scan path is based on preliminary actual surface Z-height measurements at the corresponding XY coordinates.

It will be appreciated that the details of the procedure outlined are exemplary only and not limiting. For example, widening the adjustment limits may result in fewer overall Z-height adjustments (or zones) along the scan line, which may result in better throughput, but with an increased risk of inadvertently exceeding the measurement range R1. Conversely, narrowing the adjustment limits results in more overall Z-height adjustments along scan line, and decreases the risk of inadvertently exceeding the measurement range R1. In the limit, as the adjustment limits approach each other, the precise 3D scan path ideally approaches a contour that replicates the surface profile along the scan segment, with Z offset that nominally locates the surface profile at a desired portion of the range R1 (e.g., at the middle of the range R1). Provided that the precise Z-height sensor has a sufficient sample rate that Z motion during a sample does not significantly affect the resulting measurement, and provided that a motion control Z-height position may be properly synchronized and combined with the corresponding precise Z-height sensor measurement value, such an implementation need not significantly reduce throughput or accuracy, and may be preferred in some applications.

More generally, in various embodiments configured according to the principles disclosed herein, a metrology system comprises a 3D motion control system (e.g., the motion control interface/system 132), a first type of Z-height sensing system (e.g., the chromatic confocal point sensor 300), and a second type of Z-height sensing system (e.g., a tracking autofocus (TAF) or points from focus (PFF) system) that provides less precise surface Z-height measurements over a broader Z-height measuring range. The motion control system and the second type of Z-height sensing system may be operated to determine preliminary actual surface Z-height measurements at corresponding preliminary XY coordinates located approximately along the first workpiece scan path segment (e.g., as shown below in FIG. 7A). A precise 3D scan path (e.g., as shown in FIG. 5C and/or FIG. 7A) may be determined for moving the first type of Z-height sensing system to perform precise surface Z-height measurements at corresponding XY coordinates located approximately along the first workpiece scan path segment, wherein the precise 3D scan path is based on the determined preliminary actual surface Z-height measurements at the corresponding preliminary XY coordinates. Then, at least one of the operations A) or B) may be performed:

A) using the precise 3D scan path for moving the first type of Z-height sensing system to perform precise surface Z-height measurements at corresponding XY coordinates located approximately along the first workpiece scan path segment, for the representative workpiece or a workpiece similar to the representative workpiece, or B) storing the precise 3D scan path in an inspection program that uses the precise 3D scan path for moving the first type of Z-height sensing system to perform precise surface Z-height measurements at corresponding XY coordinates located approximately along the first workpiece scan path segment, for a workpiece similar to the representative workpiece.

The operation A) above may include an operation wherein the first type of Z-height sensing system "immediately" follows the second type across portion of a workpiece, and the precise 3D scan path is determined in real time and used for the first type of Z-height sensing system as it crosses that portion of the workpiece. In some embodiments, the precise 3D scan path may be determined to comprise 3D scan path coordinates that locate the middle of the narrower Z-height measuring range of the first type of Z-height sensing system within plus or minus 25 percent of that narrower Z-height measuring range relative to the representative workpiece surface as indicated by the determined preliminary actual surface Z-height measurements at the corresponding preliminary XY coordinates. In some embodiments, the precise 3D scan path may be determined to comprise 3D scan path coordinates that nominally locate the middle of the narrower Z-height measuring range of the first type of Z-height sensing system within plus or minus 5 percent of that narrower Z-height measuring range relative to the representative workpiece surface as indicated by the determined preliminary actual surface Z-height measurements at the corresponding preliminary XY coordinates. In some embodiments, the narrower Z-height measuring range may be at most 1.0 millimeter. In some embodiments, the narrower Z-height measuring range may be at most 500 micrometers.

In some embodiments, the metrology system may include an imaging system including a camera (e.g., the camera system 260) and an objective lens (e.g., the interchangeable objective lens 250), and the second type of Z-height sensing system may be configured to sense surface Z-heights using an optical path that passes through the objective lens, e.g., as disclosed in commonly assigned U.S. Pat. No. 8,587,772, which is incorporated by reference herein. In some embodiments, the second type of Z-height sensing system may comprise an autofocus system that is operable to focus the imaging system at a focus height for a workpiece surface in the field of view of the imaging system. In some embodiments, a preliminary actual surface Z-height measurement may comprise a focus height. In some embodiments, the autofocus system may comprise at least one of a wavefront curvature sensor, a knife edge sensor, a pinhole sensor, or an image contrast evaluation portion that evaluates images from the camera. Exemplary sensors are described in U.S. Pat. Nos. 4,336,997, 4,950,878, 6,184,974, 7,301,133, 7,723,657 and 7,728,961, which are incorporated by reference herein. In some embodiments, operating the motion control system and the second type of Z-height sensing system to determine preliminary actual surface Z-height measurements at corresponding preliminary XY coordinates may comprise scanning approximately along the first workpiece scan path segment using continuous uninterrupted XY motion between the beginning XY coordinates and the ending XY coordinates. Operations comprising scanning using continuous uninterrupted XY motion may be understood with reference to commonly assigned US Patent Application Number US20130120553A1, which is incorporated by reference herein.

In some embodiments, the metrology system may include an element operable by a user to initiate automatically performing the steps of operating the motion control system and the second type of Z-height sensing system to determine preliminary actual surface Z-height measurements and determining a precise 3D scan path for moving the first type of Z-height sensing system (e.g., as described below with respect to FIGS. 6A-D).

In some embodiments, a metrology system may be configured to verify that a surface of the workpiece is within the range of the first type of Z-height sensing system along the precise 3D scan path during learn mode operations of the metrology system.

Figures 7A, 7B:
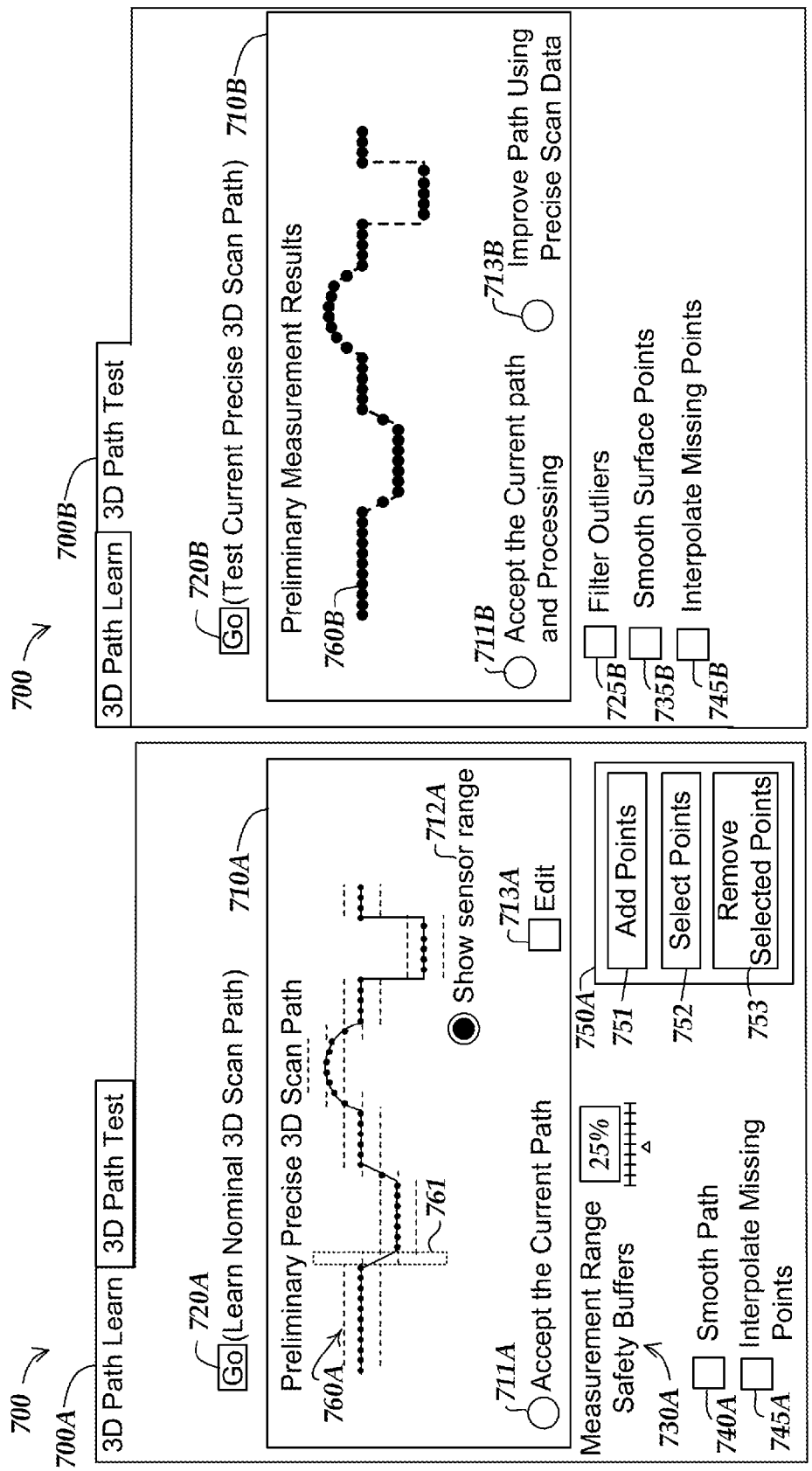
FIGS. 7A and 7B are diagrams of one embodiment of a user interface usable for determining preliminary actual surface Z-height measurements to determine a precise 3D scan path along the scan path segment of FIGS. 6A-6D, and verifying the results of operating the high precision Z-height sensing system along that precise 3D scan path.

In some embodiments, a metrology system may be configured to improve the precise 3D scan path using the first type of Z-height sensing system during learn mode operations of the metrology system (e.g., as described with respect to FIG. 7B).

FIGS. 6A-D are diagrams illustrating various tabs and features of a line tool dialog box 600 comprising high precision scan user interface features usable for defining a precise 3D scan path during learn mode operations of a metrology system. In one embodiment, the user interface features similar to those outlined below may be presented on the user interface 400 shown in FIG. 4, in response to a selection of the line tool selector 461.

FIG. 6A shows a sensor tab 610 comprising "Regular" or less precise Z-height sensor selectors including a tracking autofocus (TAF) selector 620A, and a points from focus (PFF) selector 620B, and a "High Precision" sensor selector including a CRS selector 620C. The various selectors may be automatically displayed according to the particular sensors resident on an MVIS. The selected sensor (e.g., the CRS) will be used for performing the scan operations of the line tool. The sensor tab 610 comprises parameter input or definition features, including offset coordinates 621 (e.g., between a machine coordinate system and the location of the selected sensor), a sensor sample rate 622, and a sensor Z range 623. A measurement error handling selector 624 comprises radio buttons that allow the user to define how individual measurement failures (e.g., measurement points which are invalid or unmeasurable) are to be handled: an "ignore missing point" mode 624A, an "error flag" mode 624B or a "stop" mode 624C, which are self-explanatory.

FIG. 6B shows a location tab 630 that comprises a begin scan segment input 630A and an end scan segment input 630B, for defining the X, Y and (optionally) Z coordinates where a workpiece scan path segment begins and ends. The path segment end coordinates can be either defined explicitly in the X, Y, and Z display boxes, or they can be defined relative to the beginning coordinates in the ΔX, ΔY and ΔZ display boxes. Any or all of the displayed values may initially be automatically populated based on the user set up of the scan segment 410 indicator shown in FIG. 4, including the Z-height used during that set up. If a user edits a value, associated values may be automatically adjusted. Additionally each of the Z coordinate displays comprise a respective "Use Current" selector 631A or 631B, each of which may be used to set the Z coordinates based on a current Z coordinate of the MVIS as controlled by the user (e.g., based on focusing at the beginning or end of the scan segment 410). These values may be used to initially set the measurement surface within the measuring range of the less precise Z-height sensing system (e.g., as illustrated in FIG. 5A), in order to determine preliminary actual surface height data, as outlined below.

FIG. 6C shows a scan parameters tab 640 comprising indicators 641A, 641B, and 641C, corresponding to the available sensors. The high precision indicator 641C corresponding to the sensor selected in the sensor tab 610 is indicated, and its relevant operating parameter definition elements are automatically displayed. For example, the "minimum points along scan" input 642 allows a user to define a desired minimum number of measurement points the along the scan segment. The "maximum spacing along scan" input 643 allows a user to define a desired maximum spacing between points along the scan segment. The "nominal scan speed" input 644 allows a user to define a nominal scan speed to be used for motion along the scan segment (e.g., in mm/s). These inputs may be initially populated with default values, or values that depend on previously defined or edited parameters. Of course, a user may edit such values.

The use Z-tracking selector 645, which is optional in various embodiments, allows a user to toggle "automatic" adaptive overall Z-height adjustment during a scan by a sensor, such that the overall Z-height of the sensor is adjusted in real time by monitoring its Z-height measurements, and using the motion control system to adjust the overall Z-height to continually position the most recent surface Z-height at the middle of the sensor measurement range, for example. In some embodiments, it may be used either instead of, or in combination with, the use of a predetermined precise 3D scan path determined according to principles disclosed herein. A user may select the "use predetermined 3D nominal path" selector 646 to activate associated user interface features (e.g., as illustrated in FIGS. 7 and 7B) and create a predetermined precise 3D scan path, and record associated part program instructions, according to principles disclosed herein. The "fixed" mode selector 646A causes the precise 3D scan path determined during learn mode to be recorded in a part program in a manner that uses that precise 3D scan path during run mode without adjustment of its shape. In contrast, when the "update path at runtime" mode selector 646B is selected, program instructions are generated which automatically repeat certain operations described and claimed herein for determining the Z coordinates of the precise 3D scan path, based on the actual workpiece during run mode. That is, during run mode program execution the motion control system and the "less precise" type of Z-height sensing system are operated to determine preliminary actual surface Z-height measurements at corresponding preliminary XY coordinates located along the workpiece scan path segment, and the precise 3D scan path is re-determined or edited based on those runtime preliminary actual surface Z-height measurements. This procedure may be desirable for workpieces having unpredictable features, fixturing, and/or sag, and may provide better throughput than using Z tracking in many applications.

FIG. 6D shows a filter/data tab 650 of the line tool 610A. The filter/data tab 650 comprises a type selector 651 and a data processing selector 652. The type selector 651 allows a user to select an optional data filter, e.g., measurement averaging, a low pass filter or a high pass filter, etc. The data processing selector 652 allows a user to select various measurement data post-processing or analysis features (e.g., surface interpolation or curve fitting, or the like), if desired.

FIGS. 7A and 7B are diagrams illustrating tabs and features of a 3D path learn and test dialog box 700 comprising high precision scan user interface features usable during learn mode to determine a precise 3D scan path along the scan path segment of FIGS. 6A-6D, and to verify the results of operating the high precision Z-height sensing system along that precise 3D scan path. In some embodiments, the dialog box 700 may be configured to appear when a user selects the "use predetermined 3D nominal path" selector 646 shown in FIG. 6C.

FIG. 7A shows a 3D path learn tab 700A comprising a path Z-height representation window 710A, a go selector 720A, a measurement range safety buffer definition element 730A, a smooth path selector 740A, an interpolate missing points selector 745A and a points modifier window 750A. When a user selects the go selector 720A, the metrology system automatically determines a nominal 3D scan path along the scan segment, based on high precision scan parameters defined approximately as outlined above. Generally speaking, the metrology system may automatically perform the steps of: operating the motion control system and the less-precise type of Z-height sensing system to determine preliminary actual surface Z-height measurements at corresponding preliminary XY coordinates located approximately along the workpiece scan path segment. A precise 3D scan path may be determined for moving the first type of Z-height sensing system to perform precise surface Z-height measurements at corresponding XY coordinates located approximately along the first workpiece scan path segment, wherein the precise 3D scan path is based on the determined preliminary actual surface Z-height measurements at the corresponding preliminary XY coordinates. The profile of the determined precise 3D scan path is preferably displayed in the path Z-height representation window 710A, e.g., represented as a suitable 3D scan path representation 760A comprising a line (or the associated sensor range limits shown in dashed outline, similar to those previously described with reference to FIG. 5C, when the "show sensor range" mode selector 712A is selected). In the embodiment shown in FIG. 7A, the actual measurements may also be displayed superimposed against the corresponding determined precise 3D scan path in the path Z-height representation window 710A (e.g., as dots), as well as the corresponding estimated surface (e.g., as a solid line fit to the preliminary actual measurements). Such a display helps the user to evaluate the potential desirability and/or risk associated with relying on the current set of measurements and the resulting precise 3D scan path. The representation window 710A may indicate regions of missing or problematic data. For example, a missing point indicator 761 indicates that a valid measurement was not performed in a region corresponding to problem area PA1 shown in FIGS. 5A-C. If the user judges that preliminary actual measurement data is unreliable or insufficient, and feels they have enough knowledge to supplement that data, the may select the "edit" selector 713A. The points modifier window 750A may appear in response. The user may click the "add points" selector 751 to generate a cursor that may be positioned and clicked to add "measurement" points in the representation window 710A. The "select points" selector 752, when clicked, may generate a cursor that may be positioned and operated to select measurement points in the representation window 710A. Subsequently, the "remove selected points" selector 753 may be clicked to remove currently selected points. As previously described with reference to the elements ADJMIN and ADJMAX in FIG. 5C, increasing or decreasing the "safety buffer" may result in more or fewer overall Z-height adjustments of the precise Z-height sensor along the scan segment, and/or finer or cruder following of the surface as a result. The smooth path selector 740A and/or the interpolate missing points selector 745A may be selected to smooth the nominal 3D scan path if it appears too noisy. The determined precise 3D scan path may be automatically redetermined and displayed in real time in response to any of the above editing actions, for evaluation by the user. An "undo" button may be added to the GUI if desired. When the user is satisfied with the displayed precise 3D scan path as reflected in the user interface, they may select the "accept current path" selector 711A to store the precise 3D scan path in an inspection program that uses the precise 3D scan path for moving the precise type of Z-height sensing system to perform precise surface Z-height measurements at corresponding XY coordinates located approximately along the workpiece scan path segment, for a workpiece similar to the representative workpiece used during learn mode. The user may furthermore test and/or modify the current or accepted precise 3D scan path during learn mode, by using that precise 3D scan path for moving the first type of Z-height sensing system to perform precise surface Z-height measurements at corresponding XY coordinates located approximately along the first workpiece scan path segment, for the representative learn mode workpiece, as outlined below.

FIG. 7B shows a 3D path test tab 700B comprising a surface measurement display window 710B, a go selector 720B, a filter outliers selector 725B, a smooth surface points selector 735B, and an interpolate missing points selector 745B. The surface representation window 710B comprises an accept current path and processing selector 711B and an improve path using precise scan data selector 713B.

When a user selects the go selector 720B, the metrology system automatically moves the "more precise" type of Z-height sensor (e.g., the chromatic range sensor 300) along the current nominal 3D scan path and using the defined scan parameter (e.g., as outlined previously) to measure at the defined speed along the scan segment. Preliminary measurement results 760B of the surface profile are preferably displayed in the surface measurement display window 710B. The actual measurements may be displayed superimposed against a nominal CAD profile of the surface and/or tolerance limits, if desired. The display helps the user to evaluate the potential desirability and/or risk associated with relying on the current precise 3D scan path. The user may observe that the surface measurement data is improved or more complete relative to that obtained using the less precise type of sensor (e.g., as outlined with reference to FIG. 7A.) If so, the user may choose to redetermine or "improve" the precise 3D scan path based on the actual "precise type" sensor data, by selecting the "improve path using precise scan data" selector 713B. This initiates an automated precise 3D scan path determination/redetermination similar to that outlined previously, except it is based on measurement data from "precise type" sensor data obtained during the verification test. Toward this end, the user may judiciously improve upon noisy data if desired using the "filter outliers" selector 725B, and/or the "smooth surface points" selector 740A (e.g., to implement a moving average or curve fit algorithm) and/or the "interpolate missing points" selector 745B, or the like. The resulting processed measurement point and the determined precise 3D scan path may be automatically redetermined and displayed (e.g., in the windows 710B and 710A, respectively) in real time in response to any of the above actions, for evaluation by the user. When the user is satisfied with the results, they may select either the "accept current path" selector 711A, or the "accept current path and processing" selector 711B to store the precise 3D scan path (or overwrite a previous accepted path) in an inspection program. Of course, the user may again verify the preliminary measurement results 760B using the go selector 720B, and/or repeat any of the operations outlined above, if desired.

Figure 8A:
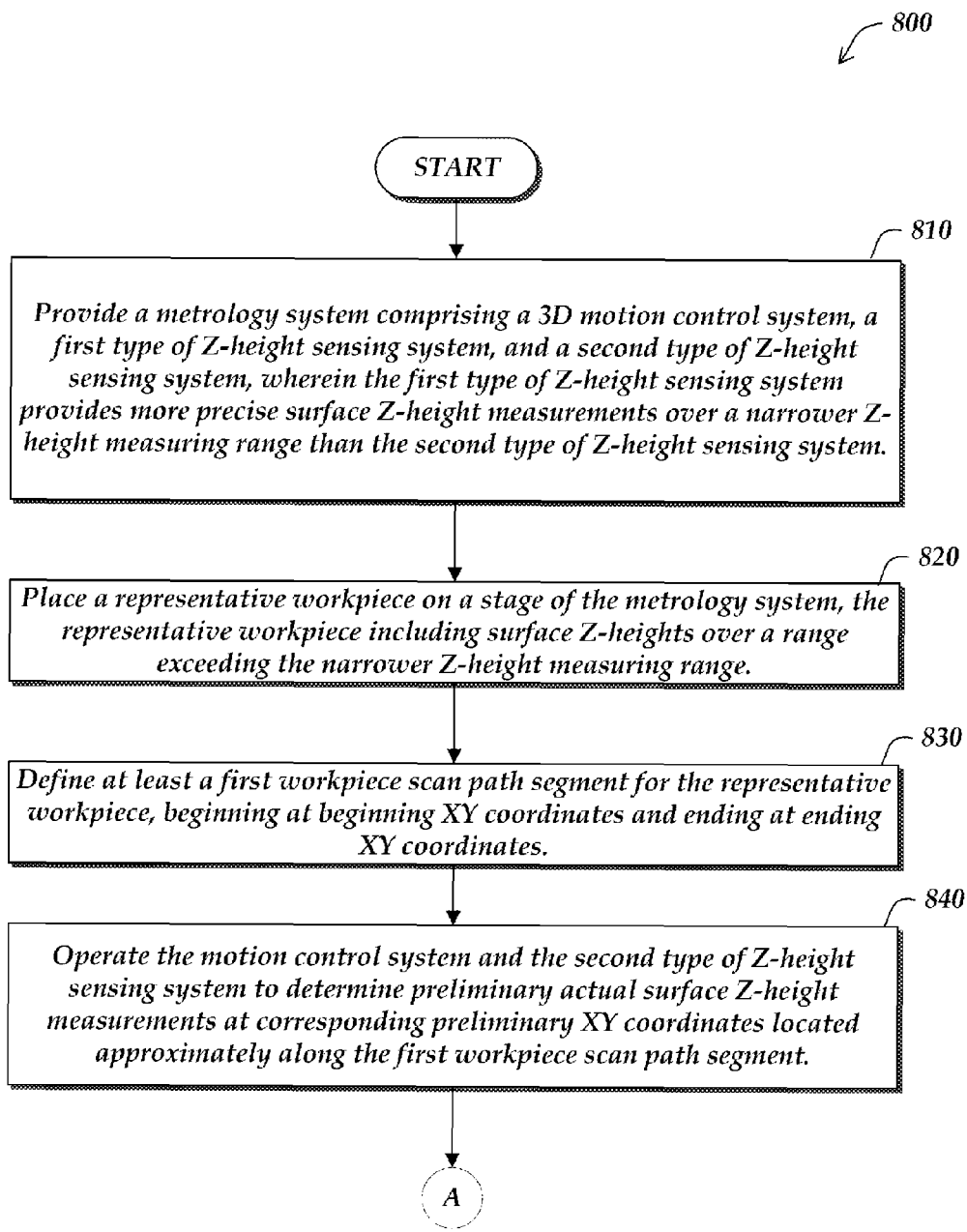
FIGS. 8A and 8B are a flow diagram showing a method for determining and using a 3D workpiece scan path for a first type of Z-height sensing system that provides more precise surface Z-height measurements over a narrower Z-height measuring range in a metrology system, the metrology system also comprising a second type of Z-height sensing system that provides less precise surface Z-height measurements over a broader Z-height measuring range.
Figure 8B:
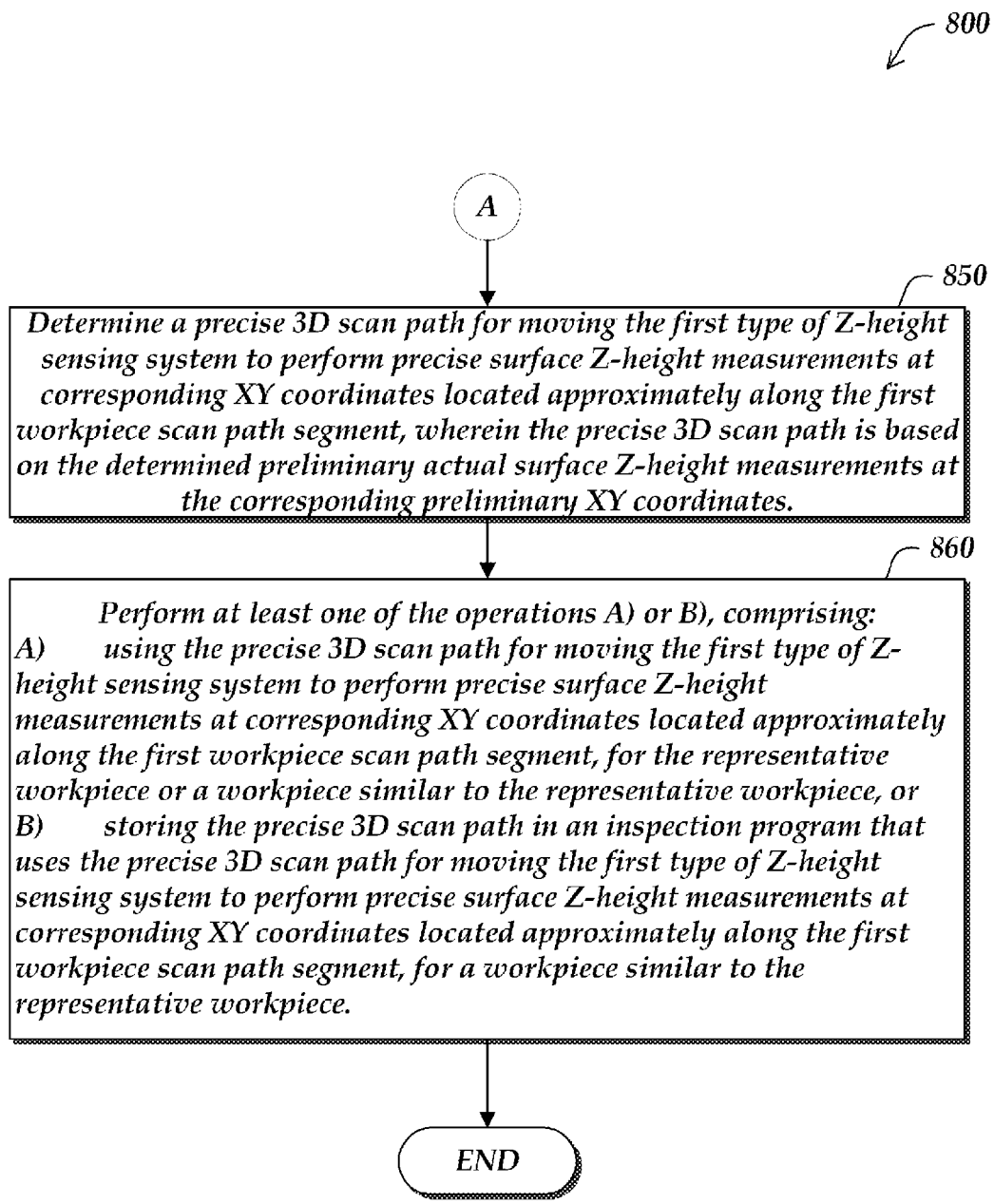

FIGS. 8A and 8B show a flow diagram 800 showing a method for programming a three-dimensional (3D) workpiece scan path for a metrology system.

At a block 810, a metrology system is provided comprising a 3D motion control system, a first type of Z-height sensing system, and a second type of Z-height sensing system, wherein the first type of Z-height sensing system provides more precise surface Z-height measurements over a narrower Z-height measuring range than the second type of Z-height sensing system.

At a block 820, a representative workpiece is placed on a stage of the metrology system, the representative workpiece including surface Z-heights over a range exceeding the narrower Z-height measuring range.

At a block 830, at least a first workpiece scan path segment is defined for the representative workpiece, beginning at beginning XY coordinates and ending at ending XY coordinates.

At a block 840, the motion control system and the second type of Z-height sensing system are operated to determine preliminary actual surface Z-height measurements at corresponding preliminary XY coordinates located approximately along the first workpiece scan path segment. The process continues to a block A.

As shown in FIG. 8B, the process continues from the block A to a block 850. At the block 850, a precise 3D scan path is determined for moving the first type of Z-height sensing system to perform precise surface Z-height measurements at corresponding XY coordinates located approximately along the first workpiece scan path segment, wherein the precise 3D scan path is based on the determined preliminary actual surface Z-height measurements at the corresponding preliminary XY coordinates. At a block 860, at least one of the operations A) or B) is performed:

A) using the precise 3D scan path for moving the first type of Z-height sensing system to perform precise surface Z-height measurements at corresponding XY coordinates located approximately along the first workpiece scan path segment, for the representative workpiece or a workpiece similar to the representative workpiece, or B) storing the precise 3D scan path in an inspection program that uses the precise 3D scan path for moving the first type of Z-height sensing system to perform precise surface Z-height measurements at corresponding XY coordinates located approximately along the first workpiece scan path segment, for a workpiece similar to the representative workpiece.

The various embodiments described above can be combined, in part or in whole, to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for programming a three-dimensional (3D) workpiece scan path for a first type of Z-height sensing system that provides more precise surface Z-height measurements over a narrower Z-height measuring range in a metrology system, the metrology system comprising a 3D motion control system, the first type of Z-height sensing system, and a second type of Z-height sensing system that provides less precise surface Z-height measurements over a broader Z-height measuring range in the metrology system, the method comprising:

placing a representative workpiece on a stage of the metrology system, the representative workpiece including surface Z-heights over a range exceeding the narrower Z-height measuring range;

defining at least a first workpiece scan path segment for the representative workpiece, beginning at beginning XY coordinates and ending at ending XY coordinates;

operating the motion control system and the second type of Z-height sensing system to determine preliminary actual surface Z-height measurements at corresponding preliminary XY coordinates located approximately along the first workpiece scan path segment;

determining a precise 3D scan path for moving the first type of Z-height sensing system to perform precise surface Z-height measurements at corresponding XY coordinates located approximately along the first workpiece scan path segment, wherein the precise 3D scan path is based on the determined preliminary actual surface Z-height measurements at the corresponding preliminary XY coordinates; and performing at least one of operations A) or B), comprising:

A) using the precise 3D scan path for moving the first type of Z-height sensing system to perform precise surface Z-height measurements at corresponding XY coordinates located approximately along the first workpiece scan path segment, for the representative workpiece or a workpiece similar to the representative workpiece, or B) storing the precise 3D scan path in an inspection program that uses the precise 3D scan path for moving the first type of Z-height sensing system to perform precise surface Z-height measurements at corresponding XY coordinates located approximately along the first workpiece scan path segment, for a workpiece similar to the representative workpiece.

2. The method of claim 1, wherein the precise 3D scan path is determined to comprise 3D scan path coordinates that locate the middle of the narrower Z-height measuring range of the first type of Z-height sensing system within plus or minus 25 percent of that narrower Z-height measuring range relative to the representative workpiece surface as indicated by the determined preliminary actual surface Z-height measurements at the corresponding preliminary XY coordinates.

3. The method of claim 2, wherein the precise 3D scan path is determined to comprise 3D scan path coordinates that nominally locate the middle of the narrower Z-height measuring range of the first type of Z-height sensing system within plus or minus 5 percent of that narrower Z-height measuring range relative to the representative workpiece surface as indicated by the determined preliminary actual surface Z-height measurements at the corresponding preliminary XY coordinates.

4. The method of claim 2, wherein the first type of Z-height sensing system comprises a chromatic range sensor, and the narrower Z-height measuring range is the specified measuring range of that chromatic range sensor.

5. The method of claim 2, wherein the narrower Z-height measuring range is at most 1.0 millimeter.

6. The method of claim 5, wherein the narrower Z-height measuring range is at most 500 micrometers.

7. The method of claim 1, wherein the metrology system includes an imaging system including a camera and an objective lens, and the second type of Z-height sensing system is configured to sense surface Z-heights using an optical path that passes through the objective lens.

8. The method of claim 7, wherein the second type of Z-height sensing system comprises an autofocus system that is operable to focus the imaging system at a focus height for a workpiece surface in the field of view of the imaging system.

9. The method of claim 8, wherein a preliminary actual surface Z-height measurement comprises a focus height.

10. The method of claim 8, wherein the autofocus system comprises at least one of a wavefront curvature sensor, a knife edge sensor, a pinhole sensor, or an image contrast evaluation portion that evaluates images from the camera.

11. The method of claim 8, wherein operating the motion control system and the second type of Z-height sensing system to determine preliminary actual surface Z-height measurements at corresponding preliminary XY coordinates comprises scanning approximately along the first workpiece scan path segment using continuous uninterrupted XY motion between the beginning XY coordinates and the ending XY coordinates.

12. The method of claim 1, wherein the metrology system comprises a high precision scan user interface usable for defining the precise 3D scan path during learn mode operations of the metrology system.

13. The method of claim 12, wherein the high precision scan user interface comprises a feature for verifying preliminary Z-height measurement results obtained when the first type of Z-height sensing system is moved along the precise 3D scan path.

14. The method of claim 12, wherein the high precision scan user interface comprises:
features usable for improving the Z coordinates of the precise 3D scan path using the first type of Z-height sensing system; and
features usable to edit or accept the precise 3D scan path used to obtain the preliminary Z-height measurement results.

15. The method of claim 12, wherein the metrology system comprises learn mode operations that automatically perform the steps of operating the motion control system and the second type of Z-height sensing system to determine preliminary actual surface Z-height measurements and determining a precise 3D scan path for moving the first type of Z-height sensing system.

16. The method of claim 15, wherein the high precision scan user interface includes an element operable by a user to initiate the automatically performing the steps of operating the motion control system and the second type of Z-height sensing system to determine preliminary actual surface Z-height measurements and determining a precise 3D scan path for moving the first type of Z-height sensing system.

17. The method of claim 1, wherein the metrology system includes an element operable by a user to initiate automatically performing the steps of operating the motion control system and the second type of Z-height sensing system to determine preliminary actual surface Z-height measurements and determining a precise 3D scan path for moving the first type of Z-height sensing system.

18. The method of claim 1, further comprising verifying that a surface of the workpiece is within the range of the first type of Z-height sensing system along the precise 3D scan path during learn mode operations of the metrology system.

19. The method of claim 1, further comprising improving the precise 3D scan path using the first type of Z-height sensing system during learn mode operations of the metrology system.

20. The method of claim 1, wherein the step A) is performed under program control during run mode operations of the metrology system.

* * * * *